(12) United States Patent
Filatov et al.

(10) Patent No.: US 11,043,737 B2
(45) Date of Patent: Jun. 22, 2021

(54) ANTENNA SYSTEM FOR VEHICLES

(71) Applicant: Advanced Automotive Antennas, S.L.U, Barcelona (ES)

(72) Inventors: Evgenii Filatov, Viladecavalls (ES); Enrique Martinez Ortigosa, Viladecavalls (ES)

(73) Assignee: ADVANCED AUTOMOTIVE ANTENNAS, S.L.U., Barcelona (ES)

( * ) Notice: Subject to any disclaimer, the term of this patent is extended or adjusted under 35 U.S.C. 154(b) by 0 days.

(21) Appl. No.: 16/795,190

(22) Filed: Feb. 19, 2020

(65) Prior Publication Data
US 2020/0266531 A1 Aug. 20, 2020

(30) Foreign Application Priority Data

Feb. 19, 2019 (EP) ..................................... 19382121

(51) Int. Cl.
*H01Q 1/32* (2006.01)
*H01Q 7/00* (2006.01)
*H01Q 9/46* (2006.01)
*H01Q 15/14* (2006.01)
*H04W 4/40* (2018.01)

(52) U.S. Cl.
CPC .......... *H01Q 1/3283* (2013.01); *H01Q 1/3266* (2013.01); *H01Q 7/00* (2013.01); *H01Q 9/46* (2013.01); *H01Q 15/14* (2013.01); *H04W 4/40* (2018.02)

(58) Field of Classification Search
CPC ........ H01Q 1/3283; H01Q 9/46; H01Q 15/14; H01Q 7/00; H01Q 9/26; H01Q 19/108; H01Q 1/3233; H01Q 1/3266; H04W 4/40
See application file for complete search history.

(56) References Cited

U.S. PATENT DOCUMENTS

| | | | | |
|---|---|---|---|---|
| 6,573,874 B1 * | 6/2003 | Saito | ....................... | H01Q 3/247 343/733 |
| 6,697,024 B2 * | 2/2004 | Fuerst | .................. | B60C 23/0444 343/711 |
| 7,439,926 B2 * | 10/2008 | Mikami | .................... | H01Q 7/00 343/789 |

(Continued)

FOREIGN PATENT DOCUMENTS

WO 2011132642 A1 10/2011

OTHER PUBLICATIONS

Extended European Search Report for European Application No. 19382121.2; Date of Completion: Aug. 21, 2019; dated Aug. 29, 2019; 4 Pages.

*Primary Examiner* — Vibol Tan
(74) *Attorney, Agent, or Firm* — Cantor Colburn LLP (57) ABSTRACT

The present disclosure refers to an antenna system vehicles, preferably for Vehicle-to-Everything (V2X) communications, comprising a planar reflector and a radiating element placed over the reflector, wherein the radiating element comprises segments, preferably straight segments, arranged to configure two connected quadrilateral frame antenna elements. Each quadrilateral frame antenna element having an inner pair of segments and an outer pair of segments, wherein the segments of the inner pairs are substantially parallel to the reflector, and the segments of the outer pairs are inclined with respect to the segments of the inner pairs. The segments of the outer pairs have one end connected with the reflector.

20 Claims, 6 Drawing Sheets

(56) References Cited

U.S. PATENT DOCUMENTS

| | | | |
|---|---|---|---|
| 7,505,011 B2* | 3/2009 | Nakanishi | H01Q 1/32 |
| | | | 343/733 |
| 8,059,041 B2 | 11/2011 | Chang | |
| 10,637,131 B2* | 4/2020 | Karlsson | B60R 1/06 |
| 10,903,555 B2* | 1/2021 | Martinez Ortigosa | H01Q 1/38 |
| 2006/0139230 A1 | 6/2006 | Shirosaka et al. | |
| 2010/0309062 A1 | 12/2010 | Chang | |

* cited by examiner

ANTENNA SYSTEM FOR VEHICLES

CROSS REFERENCE

This application claims the benefit of European Application Serial No. 19382121.2, filed Feb. 19, 2019, the disclosure of which is incorporated herein by reference in its entirety.

BACKGROUND OF THE INVENTION

The present invention relates to antenna systems, and more particularly to antenna systems for Vehicle-to-Everything (V2X) communications, such as Vehicle-to-Vehicle (V2V), i.e. trucks platooning.

There is an increasing use of (V2X) communication systems via wireless networks, for which, several communications standards have been developed, as the known Dedicated Short Range Communication (DSRC) protocol. V2X communication using DSRC are especially useful for large trucks platooning.

Vehicle platooning consist of grouping several vehicles together to travel in line as a group or platoon, wherein all vehicles in the platoon are inter-communicated in order to synchronize their acceleration, braking, and steering so that the vehicles can travel safely close to each together. For example, trucks platooning provide many advantages, such as reduction of fuel consumption by reducing drag of the vehicles following the lead vehicle, and reduction of human mistakes while driving.

Typically, the lead vehicle transmits instructions related to acceleration, braking, steering, etc. to the consecutive vehicle, and these instructions are transmitted from one vehicle to the next. Alternatively, all of the following vehicles are in direct communication with the leading vehicle. Therefore, all the vehicles in the platoon have to be provided with antennas for transmitting and/or receiving instructions.

In these applications, short to medium range communication are used to transmit control, status, as well as audio and/or video data between vehicles. Parallel communication on multiple channels between vehicles may be necessary to provide all data and information needed to maintain safe and effective platooning. However, this type of communication typically requires a direct line of sight between antennas of the two vehicles for the data to be transmitted properly.

Traditional antennas generate an omnidirectional radiation pattern which is not suitable for establishing reliable communication connections between moving vehicles.

On the other hand, it is known that BiQuad antennas are conventionally made up of two quadrilateral frame or loop antennas, with a perimeter equal to the wavelength at the operation frequency. Both frame antennas are connected in parallel and fed at the middle point thereof by means of a common feeding line. BiQuad antennas feature vertical polarization, good efficiency, self-grounding properties and relatively high directivity in front and rear directions.

For example, the U.S. Pat. No. 8,059,041 B2, filed Jun. 4, 2009, discloses a BiQuad antenna for outdoor applications, particularly adapted for receiving UHF signals, which radiating element has two quadrilateral frame antennas connected to each other and placed above a reflector plate.

However, in practical applications classical BiQuad antennas with $\lambda/4$ length of square side have high impedance (around 75 Ohms), and are mismatched with respect to typical 50 Ohms coaxial cables used for high frequency services.

Furthermore, BiQuad antennas traditionally have the following drawbacks:
  deep nulls of −10 dBi appear in side directions (90° and 270°) which is not suitable for DSRC applications; and
  there are two common ways of feeding a BiQuad antenna, but both of them are troublesome. The classical way of feeding a BiQuad antenna structure is to reach the antenna from the direction of the radiation pattern null at the center of the two quadrilaterals, but this significantly increases the total height of the structure. The second way of feeding a BiQuad, is placing a coaxial cable following on of the frame antennas, but this makes the radiation pattern misbalanced.

It would be therefore desirable to provide an antenna system for Vehicle-to-Everything (V2X) communications, that features improved efficiency and directivity, and that additionally has a robust and compact construction.

SUMMARY OF THE INVENTION

An object of the present disclosure is to provide an antenna system for (V2X) communications that features high efficiency, high directivity, and that additionally has a robust and compact design.

In a preferred embodiment, the antenna system of the present disclosure is specially adapted to operate under the Dedicated Short Range Communications (DSRC) protocol.

Another object of the present disclosure refers to a BiQuad antenna with a modified geometry of the quads for the antenna matching.

The present disclosure is defined in the attached independent claim, and satisfactorily solves the drawbacks of the prior art by providing an antenna system that features a pure vertical bidirectional radiation pattern, high efficiency, and thin horizontal profile.

More specifically, the present disclosure refers to an antenna system for vehicles, preferably for communicating a vehicle with an external communication system, for example with another vehicle.

The antenna system comprises a first reflector and a radiating element placed over the reflector, wherein the radiating element comprises segments, arranged to configure a BiQuad formed by two connected quadrilateral frame antenna elements. Each quadrilateral frame antenna element has an inner pair of segments and an outer pair of segments, wherein the segments of the same pair have the same length. The reflector is preferably planar.

The segments are preferably straight, or at least a major part of each segment is straight. In a practical embodiment, the segments are obtained from a conductive wire properly folded to configure the BiQuad geometry. In other embodiments, the segments are as conductive tracks on one or several Printed Circuit Board (PCB) arranged to configure the BiQuad geometry.

The segments of the inner pairs (closer to the center of the radiating element than the segments of the outer pair), are substantially parallel to the reflector, and the segments of the outer pairs are inclined, with respect to the segments of the inner pairs and with respect to the first reflector. Additionally, the ends of the segments of the outer pair are connected with the reflector.

The radiating element is therefore a three-dimensional structure, that due to its mechanical attachment at two separate points with the reflector, is realized as a robust structure of thin profile (total height of the structure is decreased down to about ⅓ lambda).

Additionally, the connection of the radiating element with the reflector: makes the radiating element self-grounded, reduces side nulls of up to −5 dBi, and maximize the antenna's directivity in front and rear directions to cover left and right sides of a vehicle, without mismatching the antenna.

Each of the segments of one of the inner pairs is connected with a segment of the other inner pair, and wherein there is a gap between a first pair of connected segments and a second pair of connected segments. The feeding line has a positive pole connected with one of the pairs of connected segments, and a negative pole connected with the other pair of connected segments and with the first reflector.

In a preferred embodiment, the feeding line runs longitudinally on the lower surface of the reflector, passes transversally through the reflector and extends below the pairs of inner segments. With this routing of the feeding line, the antenna system is compact and can be easily integrated within a protective casing or housing.

The quadrilateral frame antenna elements are stretched lengthwise, so that the segments of one of the pairs (the inner pairs or the outer pairs) are longer than the segments of the other pair. Preferably, the segments of the outer pairs are longer than the segments of the inner pairs, such as the radiating element has a "double rhomboid" or "double diamond" configuration in a top plan view. The effect of stretching the quadrilateral frame antenna elements is that the antenna impedance is decreased and matched to 50 Ohms, which is the typical impedance of a coaxial cable.

The segments of the outer pairs define respectively two vertices that are aligned with respect to an axis (x). The segments of the inner pair, and the segments of the outer pair of the same frame antenna element, define respectively two vertices (in top plan view of the radiating element) that are aligned with respect to axis (y1,y2) that are orthogonal to the axis (x). The reflector is rectangular and its width is shorter than the distance between any the two vertices aligned with respect to axis (y1,y2).

The radiating element is a symmetric structure in a top plan view of the same with respect to the axis (x), and with respect to an axis orthogonal to the line (x) and passing through the feeding point.

Preferably, the distance between the vertices formed by the segments of the outer pairs, is substantially 0.9 wavelength (λ) at the operating frequency of the antenna system. Likewise, the length of the reflector is preferably 0.9 wavelength (λ), that is, similar to the distance between the vertices formed by the segments of the outer pairs.

In a preferred embodiment, the antenna system comprises a second reflector, preferably planar, connected with one of the short sides of the first reflector, and placed transversally with respect to the first reflector. The effect of this second reflector, is that at the opposite site of the reflector to which the second reflector is connected, the side null in the side direction are reduced, such as the side direction of the radiation pattern is increased up to 0 dbi.

In a preferred embodiment, the reflector width is ⅕ of the wavelength (λ) at the operating frequency, such as, the antenna system is balanced, keeps efficiency and it is properly matched.

The antenna system is preferably adapted to operate within the V2X frequency range, and preferably adapted to operate in accordance with the Dedicated Short Range Communications (DSRC) protocol.

The present disclosure also refers to a casing configured to be attached externally to a vehicle, like a truck, wherein the casing houses the radiating element, the reflector and a part of the feeding line as described above. The casing configuration and the arrangement of the radiating element and first reflector within the casing, are designed (or selected) such as in use, that is, when the casing is attached to an external surface of a vehicle, like a truck, the first reflector is transversally arranged to ground assuming that the ground is generally flat surface. This is to say, the reflector lays on a plane, and this plane is transversal to ground.

Some of the advantages of the antenna system of the present disclosure are summarized below:
high efficiency and directivity;
wideband performance;
bi-directional radiation pattern suitable for platooning applications;
pure vertical polarization;
robust construction; and
integration flexibility due to its compact design.

BRIEF DESCRIPTION OF THE DRAWINGS

Preferred embodiments of the present disclosure are henceforth described with reference to the accompanying drawings, wherein.

DETAILED DESCRIPTION

FIG. 1 shows an antenna system 1 comprising a first planar reflector 3 and a radiating element 2 placed over the reflector 3. The radiating element 2 is formed by a set of straight segments, eight segments in particular, arranged and connected to configure two connected quadrilateral frame antenna elements 4, 5. Each quadrilateral frame antenna element 4, 5 has an inner pair of segments 4a, 4b, 5a, 5b and an outer pair of segments 4c, 4d, 5c, 5d. The inner segments are closer to the center of the radiating element and closer to the feeding connection, than the outer segments.

Figure 1A:
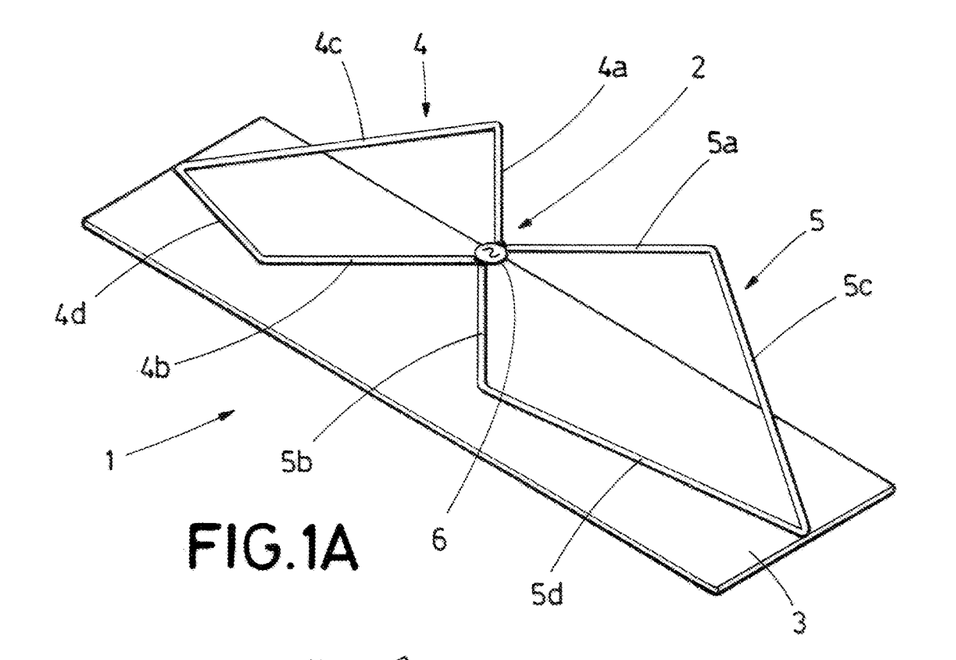
FIG. 1A shows one perspective view of an antenna system including a radiating element and a reflector.
Figure 1B:
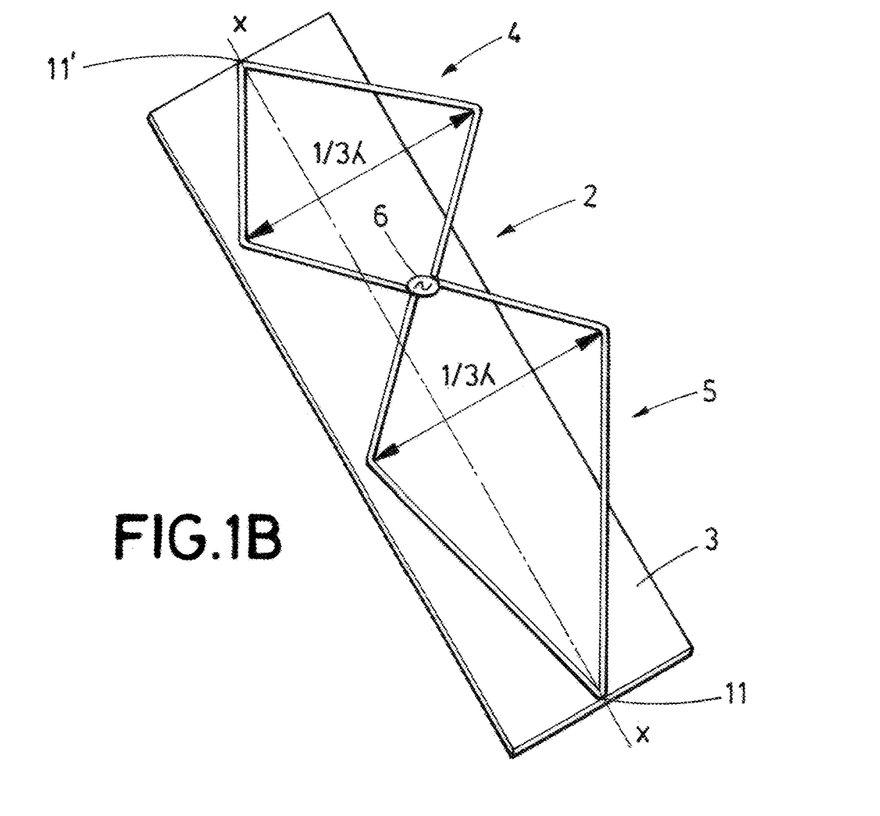
FIG. 1B shows another perspective view of the radiating element and the reflector.

The first planar reflector 3 is a metallic plate that can be supported by a substrate (not shown), for example the reflector can be embodied as a conducting surface of a Printed Circuit Board (PCB). The first reflector 3 has a lower surface and an upper surface, wherein the upper surface is closer to the radiating element than the lower surface. The first reflector 3 is rectangular in this preferred embodiment, having a width (W) and a height (H).

Figure 1C:
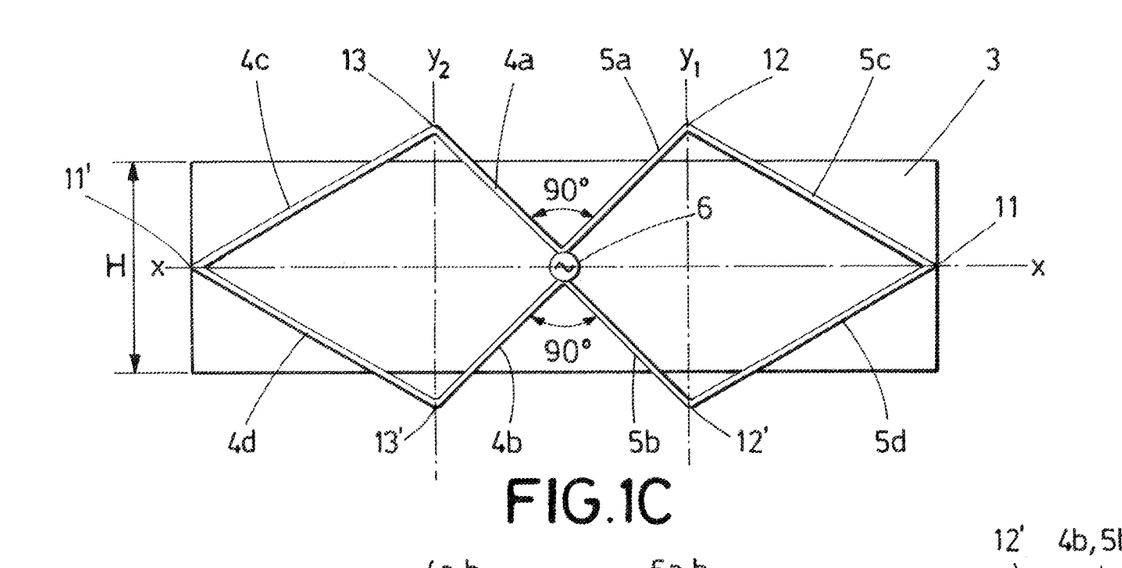
FIG. 1C shows a top plan view of the radiating element and the reflector.
Figure 1D:
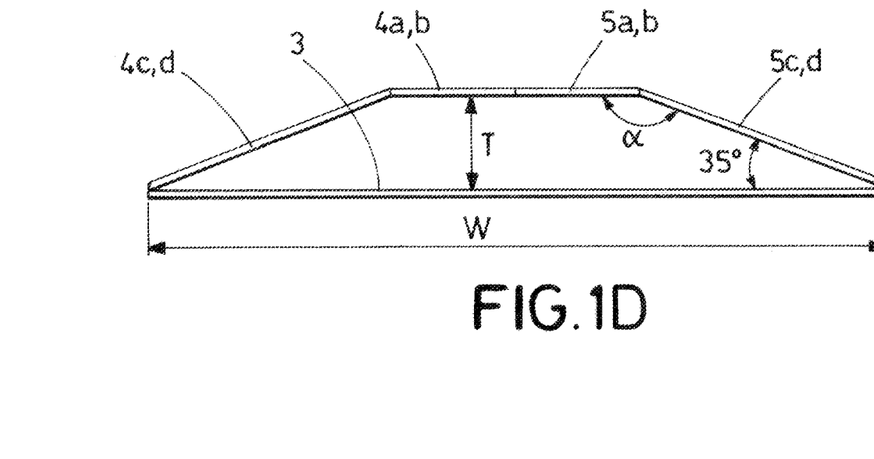
FIG. 1D shows a front elevational view of the radiating element and the reflector.
Figure 1E:
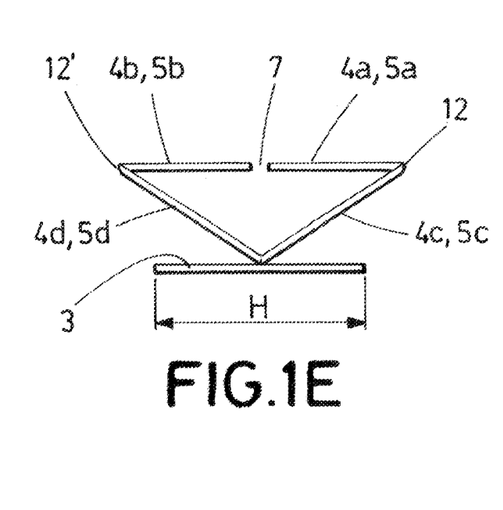
FIG. 1E shows a side elevational view of the radiating element and the reflector.
Figure 1F:
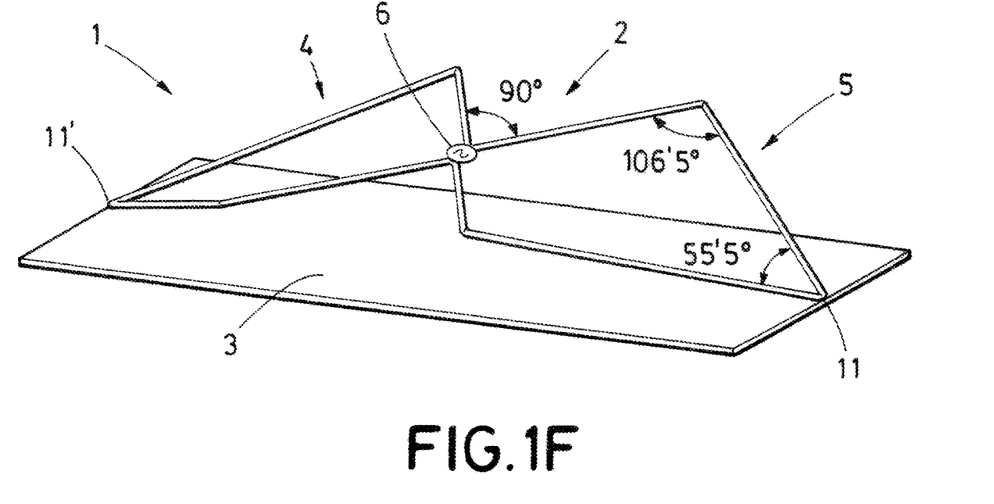
FIG. 1F shows another perspective view of the radiating element and the reflector.

Unlike prior art BiQuad antennas, the radiating element 2 is a three-dimensional structure as illustrated in FIGS. 1D, 1E. The segments 4a, 4b, 5a, 5b of the inner pairs are substantially parallel to the reflector 3, and the segments 4c, 4d, 5c, 5d of the outer pairs are inclined, that is, define an angle ($\alpha$) with respect to the respective segments 4a, 4b, 5a, 5b of the inner pairs to which they are connected. Preferably the angle ($\alpha$) in the front view of FIG. 1D is about 155°. The angle between any of the segments 4c, 4d, 5c, 5d and the reflector 3 is about thirty-five degrees (35°).

As an example, for a Dedicated Short Range Communications (DSRC) protocol with an operating frequency of about 5.9 GHz, and taking into account that c0=3e8 m/s then wavelength for that operating frequency is lambda ($\lambda$)=c0/Freq then lambda=3e+8/5.9 GHz is about fifty-one millimeters (51 mm).

The length of the segments 4a, 4b, 5a, 5b is preferably within a range of $\frac{1}{5}(\lambda)$+/−0.06 ($\lambda$), and more preferably within a range of $\frac{1}{5}$+/−0.03 ($\lambda$), at the operating frequency, that is, with an operating frequency of 5.9 GHz, the length of these segments is about eleven and a half millimeters (11.5 mm).

The length of the segments 4c, 4d, 5c, 5d is preferably within a range of $\frac{1}{3}$ ($\lambda$)+/−0.06 ($\lambda$), and more preferably within a range of $\frac{1}{3}$ ($\lambda$)+/−0.03 ($\lambda$), at the operating frequency, that is, with an operating frequency of 5.9 GHz, the length of these segments is about seventeen and a half millimeters (17.5 mm).

The antenna system 1 features a thin profile since the distance or thickness (T) between the segments 4c, 4d, 5c, 5d of the inner pairs and the reflector 3, is preferably within a range of $\frac{1}{10}$ ($\lambda$)+/−0.04 ($\lambda$), more preferably within a range of $\frac{1}{10}$ ($\lambda$)+/−0.02 ($\lambda$), and preferably about $\frac{1}{10}$ of the wavelength ($\lambda$) at the operating frequency, that is, with an operating frequency of 5.9 GHz, the total more preferably thickness of the antenna system is about five and a half millimeters (5.5 mm).

The total electric length of each connected quadrilateral frame antenna elements 4, 5, that is, the sum of the length of all four segments of each quadrilateral frame antenna elements 4, 5, is preferably within a range of 1.1 ($\lambda$)+/−0.2 ($\lambda$), of more preferably within a range of 1.1 ($\lambda$)+/−0.1 ($\lambda$), and preferably 1.1 ($\lambda$) of the wavelength ($\lambda$) at the operating frequency, that is, with an operating frequency of 5.9 GHz, the total more preferably electric length of each connected quadrilateral frame antenna elements 4, 5 is about fifty-eight millimeters (58 mm).

Additionally, the segments 4c, 4d, 5c, 5d of the outer pairs are connected together at their ends configuring vertices 11, 11' of the quadrilateral frame antenna elements 4, 5, and connected with the reflector 3. In this way, the radiating element 2 is grounded and it is reinforced mechanically. Furthermore, that arrangement, reduce side nulls up to −5 dBi, maximizing the antenna's directivity in front and rear directions.

As shown more clearly in FIG. 1D, the width (W) of the reflector is equal to the distance between the vertices 11, 11' defined by the segments 4c, 4d and 5c, 5d of the outer pairs of segments. Preferably, this width (W) is preferably within a range of 0.9 ($\lambda$)+/−0.2 ($\lambda$), of more preferably within a range of 0.9 ($\lambda$)+/−0.1 ($\lambda$), and preferably 0.9 ($\lambda$) of the wavelength ($\lambda$) at the operating frequency, that is, with an operating frequency of 5.9 GHz, the total more preferably width (W) of the reflector 3 is about forty-five millimeters (45 mm).

In the preferred embodiment of FIG. 1, the segments of the same pair have the same length, that is, the segments of the inner pairs 4a, 4b, 5a, 5b have substantially the same length, and the segments 4c, 4d, 5c, 5d of the outer pairs have substantially the same length. In order to match the antenna to a 50 Ohms impedance, one of the sets of segments of the same length, are longer than the segments of the other set. In this preferred embodiment, the segment 4c, 4d, 5c, 5d of the outer pairs, are longer than the segments 4a, 4b, 5a, 5b of the inner pairs.

The segments 4a, 5a define a ninety degree (90°) angle, and the segments 4b, 5b define a ninety degree (90°) angle. In the top plan view of FIG. 1C, the radiating element 2 configures a double rhomboid or double diamond configuration shape.

As shown more clearly in FIG. 1C, the vertices 11, 11' defined by the segments 4c, 4d, 5c, 5d of the outer pairs, are aligned with respect to an axis (x), and the segments of the inner pair and the segments of the outer pair of the same frame antenna elements, define in a top plan view, respectively vertices 12, 12', 13, 13' that are aligned with respect to axis (y1, y2) that are orthogonal to the axis (x).

It can be noted in FIGS. 1C, 1E that the height (H) of the reflector 3 is smaller than the distance between any of the pair of vertices 12, 12', 13, 13'. Preferably, for proper matching of the antenna, the reflector height (H) is preferably within a range of $\frac{1}{5}$ ($\lambda$)+/−0.06 ($\lambda$), of more preferably within a range of $\frac{1}{5}$ ($\lambda$)+/−0.03 ($\lambda$), and preferably $\frac{1}{5}$ ($\lambda$) of the wavelength ($\lambda$) at the operating frequency, that is, with an operating frequency of 5.9 GHz, the total more preferably height (H) of the reflector 3 is about ten millimeters (10 mm).

The total height of the antenna system 1 is the distance between the pair of vertices 12, 12', 13, 13'. Preferably, for proper matching of the antenna, the total height of the antenna is preferably within a range of $\frac{1}{3}$ ($\lambda$)+/−0.06 ($\lambda$), of more preferably within a range of $\frac{1}{3}$ ($\lambda$)+/−0.03 ($\lambda$), and preferably $\frac{1}{3}$ ($\lambda$) of the wavelength ($\lambda$) at the operating frequency, that is, with an operating frequency of 5.9 GHz, the total more preferably height (H) of the reflector (3) is about sixteen millimeters (16 mm).

The segments 4c, 4a, 5a, 5c are consecutive and connected at their ends as to form a first branch of the radiating element 2, and similarly the segments 4d, 4b, 5b, 5d are consecutive and connected at their ends as to form a second branch of the radiating element 2, such a gap 7 is formed between the connected segments 4a, 5a of the first branch and the connected segments 4b, 5b of the second branch.

Figure 2A:
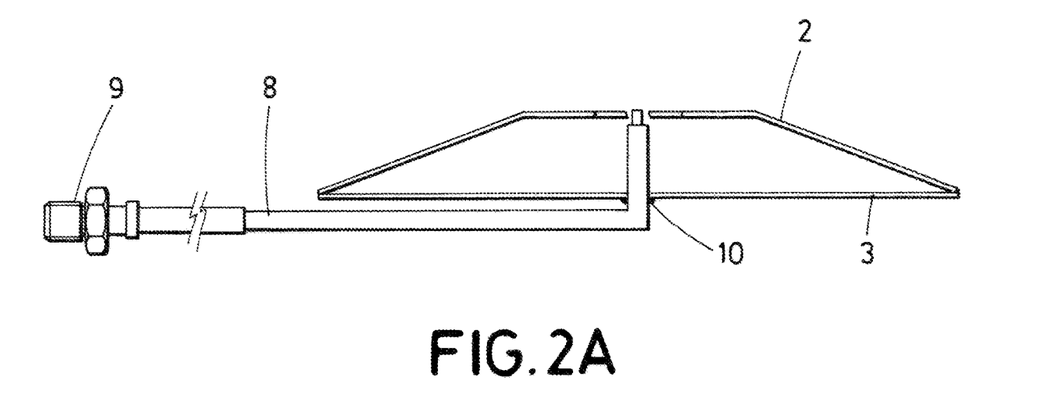
FIG. 2A shows a front elevational view of an arrangement of the antenna system including a feeding line with the radiating element and the reflector.

As shown in FIG. 2A, the antenna system is fed at the center of the radiating element 2 by means of a feeding line 6, for example a coaxial cable 8, which has one pole connected with the connected segments 4a, 5a for example the negative or ground pole 8b, and the positive pole 8a connected with the connected segments 4b, 5b.

The coaxial cable 8 is placed on the lower surface of the reflector 3 extending longitudinally in the direction of axis (x), it is bent, in this case ninety degrees (90°), and passes through an opening 10 (at the geometric center of the same) in the reflector 3 extending transversally to the reflector reaching the segments of the inner pairs. The ground pole 8b of the coaxial cable 8 is also connected with the reflector 3 as shown in FIGS. 2A, 2C.

Figure 2B:
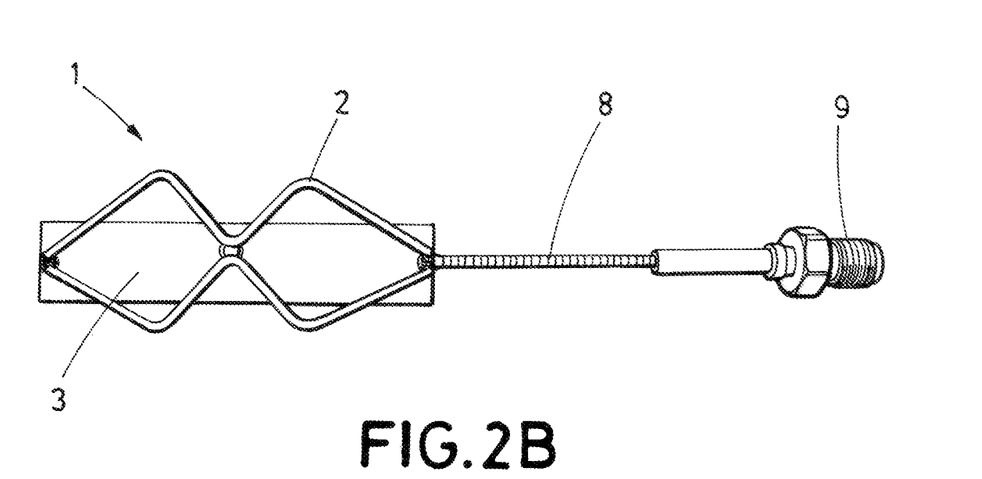
FIG. 2B shows a perspective view of the arrangement.
Figure 2C:
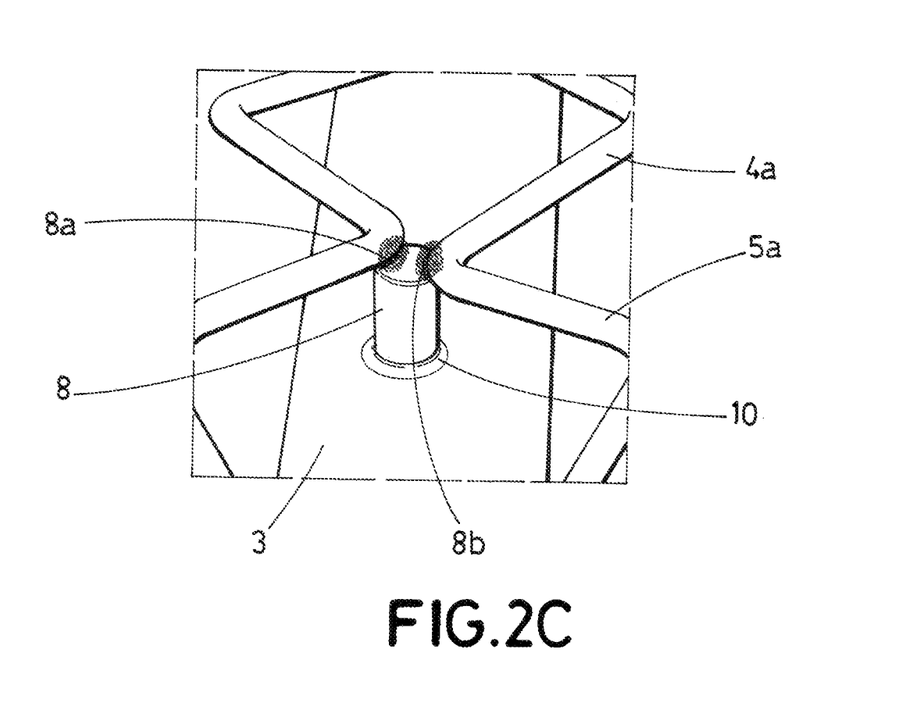
FIG. 2C shows an enlarged, partial, perspective view of the arrangement.

As shown in FIG. 2B, the coaxial cable 8 extends beyond the reflector and it is provided with a connector 9 at its free end for its connection to an external circuit (not shown).

Figure 3:
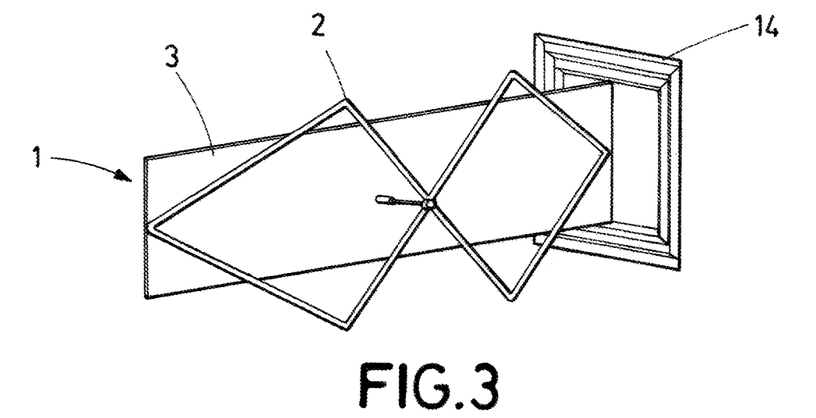
FIG. 3 shows a perspective view of another embodiment of the antenna system including a lateral reflector.

In the preferred embodiment of FIG. 3, the antenna system 1 comprises a second planar reflector 14 connected with one of the short sides of the first reflector 3, and placed orthogonally with respect to the first reflector. This second reflector 14 reduces nulls at the opposite side of the reflector, in the side direction, such as the side direction of the radiation pattern is increased.

Figure 4A:
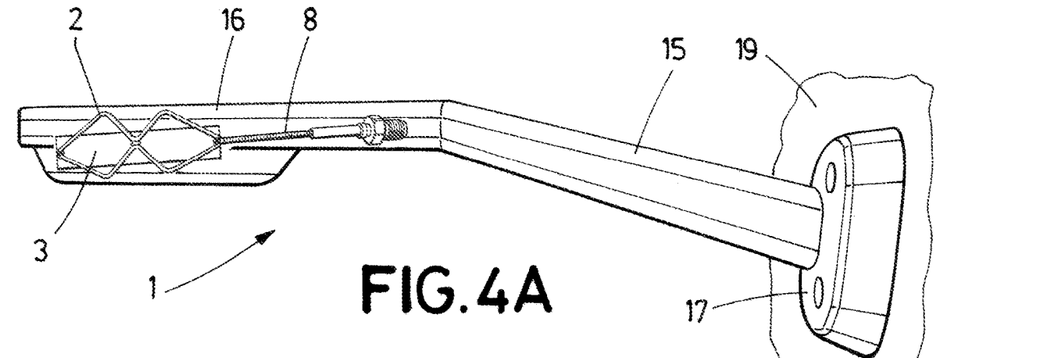
FIG. 4A shows a perspective view of a casing integrating the antenna system, and with portions removed to show internal detail.
Figure 4B:
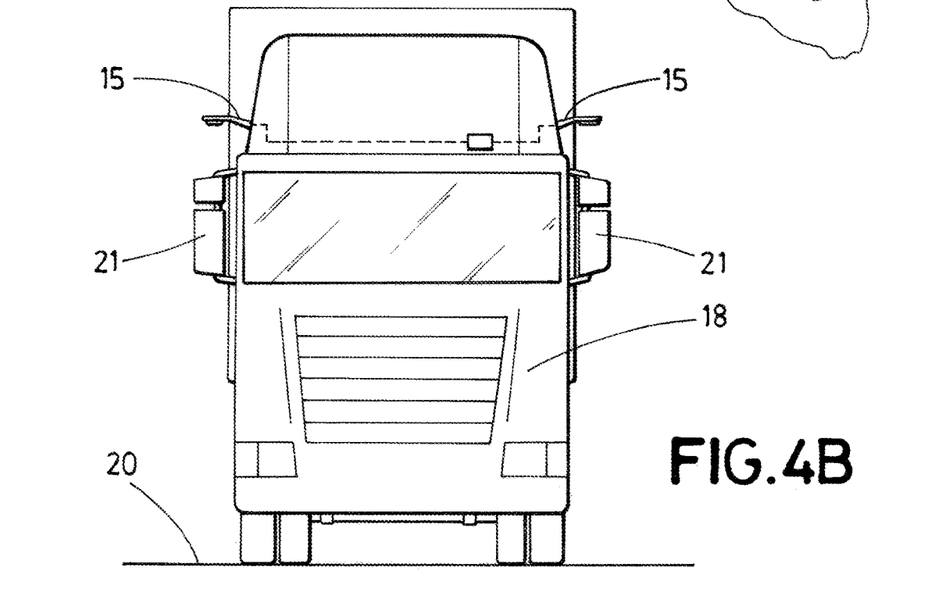
FIG. 4B shows an exemplary location of the casing in a truck.

In the preferred embodiment of FIGS. 4A and 4B, the antenna system 1 comprises a casing 15 in the form of an elongated arm, which has at one free end a housing 16 wherein the radiating element 2, reflector 3 are enclosed and fitted, and a base 17 configured for its attachment to an external surface 19 of a vehicle. The casing 15 has a channel running internally wherein the feeding line 8 is located being the feeding line accessible from outside the casing 15 for its connection with a communication system of a vehicle.

As shown in FIG. 4A, the casing 15 is configured, and the radiating element 2 and first reflector 3 are arranged, within the casing 15, such as, when the casing 15 is attached to an external surface 19 of a vehicle 18, the first reflector 3 is transversally arranged (in any angle) with respect to ground 20. Additionally, the casing 15 is configured and the reflector 3 is arranged within the casing 2, such as, when the casing 15 is attached to an external surface 19 of a vehicle 18, the longer edges of the reflector 3 are parallel to ground 20. This position of the radiation element 2 and the reflector 3 relative to the vehicle, generates a radiation pattern suitable for V2X communications.

In a preferred embodiment, the casing 15 is the casing or any arm of an external rearview mirror 21 for a vehicle. Similarly, in this case, radiating element 2 and first reflector 3 are arranged within the casing an external rearview mirror for a vehicle, such as, when the casing is attached to an external surface 19 of a vehicle 18, the first reflector 3 is transversally arranged with respect to the ground 20. Additionally, the casing 2 of an external rearview mirror is configured and the reflector 3 is arranged within the casing 2, such as, when the casing 15 is attached to an external surface 19 of a vehicle 18, the longer edges of the reflector 3 are parallel to ground 20, and the reflector is transversally arranged to the longitudinal axis of the vehicle.

Figure 5A:
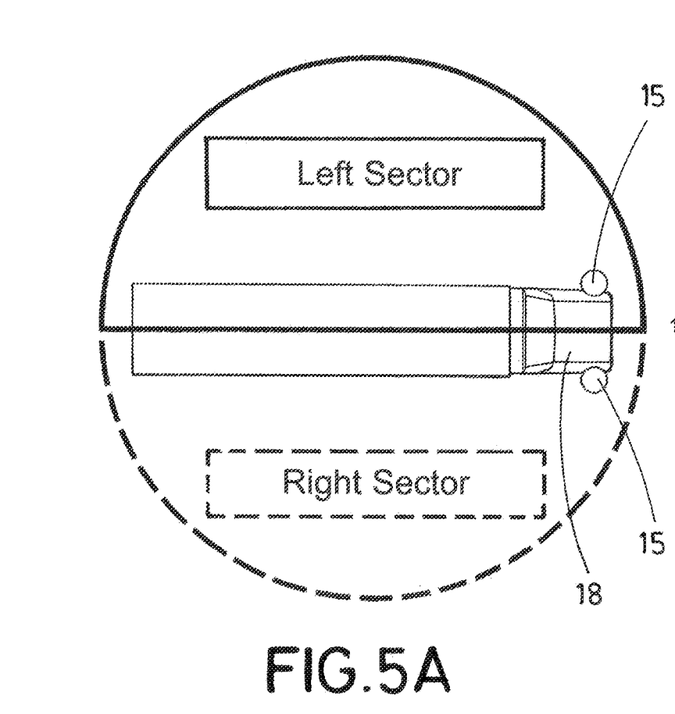
FIG. 5A is a schematic, top plane, view of a long truck incorporating two antenna systems attached to a cabin covering respective right and left sectors of the truck.
Figure 5B:
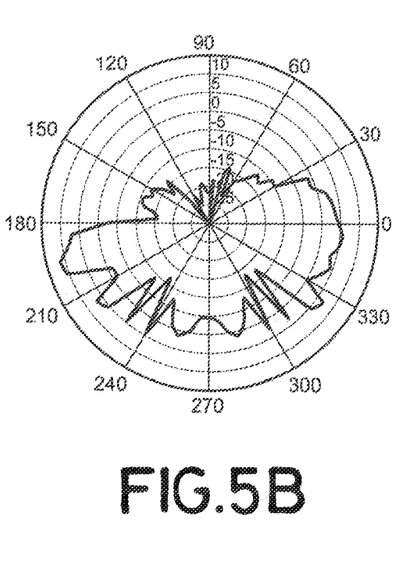
FIG. 5B is a graph of antenna system radiation patterns for the right antenna system of FIG. 5A.
Figure 5C:
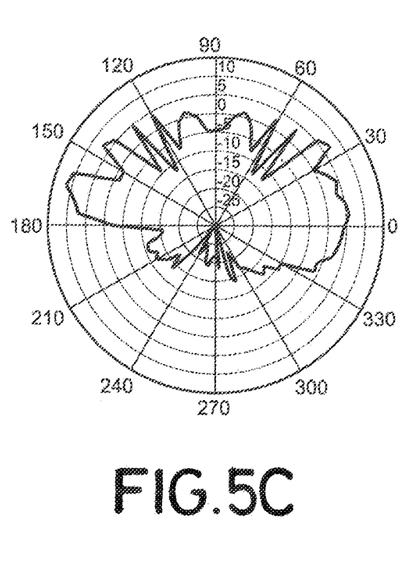
FIG. 5C is a graph of antenna system radiation patterns for the left antenna system of FIG. 5A.

In a practical application as the one shown in FIGS. 4B and 5A, the antenna system is used for truck platooning, such as, two antenna systems 1 as the one previously described are used, one attached at the right side of the truck cabin 18, and another one attached to the left side.

The present disclosure also refers to a vehicle 18 having two antenna systems 1 as the one described above, respectively attached externally to left and right sides of the vehicle, and wherein the antenna systems 1 are configured such as the reflectors 3 are generally transversally arranged with respect to ground 20. Described in another way, the axis (y1,y2) are generally vertical to ground.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed but will include all embodiments falling within the scope thereof.

The invention claimed is:

1. An antenna system for vehicles, comprising:
   a first planar reflector;
   a radiating element placed over the reflector and including segments arranged to configure two connected quadrilateral frame antenna elements, each quadrilateral frame antenna element having an inner pair of segments and an outer pair of segments, wherein the segments of the inner pairs are substantially parallel to the reflector, and the segments of the outer pairs are inclined with respect to the segments of the inner pairs, and wherein the segments of the outer pairs have one end connected with the reflector; and
   a feeding line connected with the segments of the inner pairs and connected with the reflector.

2. The antenna system according to claim 1, wherein at least a major part of each segment is straight, and wherein the segments of the same pair of segments have the same length, and wherein the segment of the outer pairs are longer than the segments of the inner pairs.

3. The antenna system according to claim 2, wherein the segments of the outer pairs define together respectively two vertices that are aligned with respect to an axis, and wherein the segments of the inner pair and the segments of the outer pair of the same frame antenna elements, define respectively two vertices that are aligned with respect to axis (y1,y2) that are orthogonal to the axis, and wherein the reflector is rectangular and the width of the reflector is shorter than the distance between any the two vertices aligned with respect to the axis (y1,y2).

4. The antenna system according to claim 3, wherein each of the segments of one of the inner pairs is connected with a segment of the other inner pair, and wherein there is a gap between a first pair of connected segments and a second pair of connected segments, and wherein the feeding line has a positive pole connected with one of the pairs of connected segments, and a negative pole connected with the other pair of connected segments and with the first reflector.

5. The antenna system according to claim 4, wherein the first reflector has a lower surface and an upper surface, wherein the upper surface is closer to the radiating element than the lower surface, and wherein the feeding line runs longitudinally on the lower surface of the reflector, passes transversally through the reflector and extends below the pairs of inner segments.

6. The antenna system according to claim 5, wherein the width of the reflector is substantially equal to the distance between the vertices defined by the segments of the outer pairs.

7. The antenna system according to claim 6, wherein the distance between the vertices is within a range of 0.9 ($\lambda$)+/−0.2 ($\lambda$), or within a range of 0.9 ($\lambda$)+/−0.1 ($\lambda$) or substantially 0.9 ($\lambda$) of the wavelength at the operating frequency.

8. The antenna system according to claim 1, further comprising a second reflector connected with one of the short sides of the first reflector, and placed transversally with respect to the first reflector.

9. The antenna system according to claim 8, wherein the first pair of connected segments define a ninety degree angle, and second pair of connected segments define a ninety degree angle.

10. The antenna system according to claim 9, wherein each of the segments of the outer pair of segments, define a thirty-five degree angle with the first reflector.

11. The antenna system according to claim 10, wherein the height of the first reflector is within a range of ⅕ ($\lambda$)+/−0.06 ($\lambda$), or within a range of ⅕ ($\lambda$)+/−0.03 ($\lambda$) or is substantially ⅕ ($\lambda$) of the wavelength ($\lambda$) at the operating frequency.

12. The antenna system according to claim 11, wherein the distance between the segments of the inner pairs and the first reflector is within a range of 1/10 ($\lambda$)+/−0.04 ($\lambda$), or within a range of 1/10 ($\lambda$)+/−0.02 ($\lambda$), or is substantially 1/10 of the wavelength ($\lambda$) at the operating frequency.

13. The antenna system according to claim 12, adapted to operate in accordance with a Dedicated Short Range Communications (DSRC) protocol.

14. The antenna system according to claim 13, further comprising a casing configured to be attached externally to a vehicle, and wherein the radiating element, reflector and a part of the feeding line are enclosed within the casing.

15. The antenna system according to claim 14, wherein the casing configuration and the arrangement of the radiating element and first reflector within the casing, are selected such as, when the casing is attached to an external surface of a vehicle, the first reflector is transversally arranged to ground.

16. The antenna system according to claim 1, wherein the segments of the outer pairs define together respectively two vertices that are aligned with respect to an axis, and wherein the segments of the inner pair and the segments of the outer pair of the same frame antenna elements, define respectively two vertices that are aligned with respect to axis (y1,y2) that are orthogonal to the axis, and wherein the reflector is rectangular and the width of the reflector is shorter than the distance between any the two vertices aligned with respect to the axis (y1,y2).

17. The antenna system according to claim 1, wherein each of the segments of one of the inner pairs is connected with a segment of the other inner pair, and wherein there is a gap between a first pair of connected segments and a second pair of connected segments, and wherein the feeding line has a positive pole connected with one of the pairs of connected segments, and a negative pole connected with the other pair of connected segments and with the first reflector.

18. The antenna system according to claim 1, wherein the first reflector has a lower surface and an upper surface, wherein the upper surface is closer to the radiating element than the lower surface, and wherein the feeding line runs longitudinally on the lower surface of the reflector, passes transversally through the reflector and extends below the pairs of inner segments.

19. The antenna system according to claim 1, wherein the width of the reflector is substantially equal to the distance between the vertices defined by the segments of the outer pairs.

20. The antenna system according to claim 19, wherein the distance between the vertices is within a range of 0.9 ($\lambda$)+/−0.2 ($\lambda$), or within a range of 0.9 ($\lambda$)+/−0.1 ($\lambda$) or substantially 0.9 ($\lambda$) of the wavelength at the operating frequency.

* * * * *